(12) United States Patent
Suri et al.

(10) Patent No.: US 8,644,314 B2
(45) Date of Patent: Feb. 4, 2014

(54) PROTOCOL AND METHOD OF VIA FIELD COMPRESSION IN SESSION INITIATION PROTOCOL SIGNALING FOR 3G WIRELESS NETWORKS

(75) Inventors: Atul Suri, San Diego, CA (US);
Anupam Juneja, San Diego, CA (US);
Yash Kharia, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 1515 days.

(21) Appl. No.: 11/470,738

(22) Filed: Sep. 7, 2006

(65) Prior Publication Data
US 2008/0069112 A1    Mar. 20, 2008

(51) Int. Cl.
*G06F 15/16* (2006.01)
(52) U.S. Cl.
USPC .......................... 370/392; 709/247
(58) Field of Classification Search
None
See application file for complete search history.

(56) References Cited

U.S. PATENT DOCUMENTS

| | | | | |
|---|---|---|---|---|
| 6,600,841 | B1* | 7/2003 | Friederich et al. | 382/305 |
| 6,766,147 | B2 | 7/2004 | O'Hare et al. | |
| 6,807,173 | B1* | 10/2004 | Lee et al. | 370/389 |
| 7,412,541 | B1* | 8/2008 | Stadler et al. | 709/247 |
| 2003/0009595 | A1* | 1/2003 | Collins | 709/247 |
| 2003/0233478 | A1 | 12/2003 | Chuah et al. | |
| 2004/0152469 | A1* | 8/2004 | Yla-Outinen et al. | 455/453 |
| 2004/0255039 | A1* | 12/2004 | Honeisen | 709/230 |
| 2005/0083974 | A1* | 4/2005 | Mayer et al. | 709/219 |
| 2005/0086327 | A1* | 4/2005 | Mayer et al. | 709/219 |
| 2005/0144326 | A1* | 6/2005 | Sugar et al. | 709/247 |
| 2005/0220095 | A1* | 10/2005 | Narayanan et al. | 370/389 |
| 2006/0075132 | A1* | 4/2006 | Liu et al. | 370/477 |
| 2006/0262812 | A1* | 11/2006 | Liu et al. | 370/477 |
| 2007/0133440 | A1* | 6/2007 | Bouat | 370/282 |
| 2007/0171907 | A1* | 7/2007 | Mansutti et al. | 370/389 |
| 2008/0062863 | A1* | 3/2008 | Ginde | 370/221 |
| 2008/0205330 | A1* | 8/2008 | Stadler et al. | 370/328 |
| 2009/0013078 | A1* | 1/2009 | Bencheikh | 709/227 |
| 2009/0129388 | A1* | 5/2009 | Akhtar et al. | 370/392 |

FOREIGN PATENT DOCUMENTS

JP   2004-531993 A   10/2004
WO   WO 2005/011175   2/2005

OTHER PUBLICATIONS

Rosenberg, J., Schulzrinne, H., Camarillo, G., Johnston, A., Peterson, J., Sparks, R., Handley, M. and E. Schooler, "SIP: Session Initiation Protocol", RFC 3261, Jun. 2002.*
M. Garcia-Martin, C. Bormann, J. Ott, R. Price, A.B. Roach, "The Session Initiation Protocol (SIP) and Session Description Protocol (SDP) Static Dictionary for Signal Compression (SigComp)", RFC 3485, Feb. 2003, the entire document.*
Camarillo, Ericsson G., "Compressing the Session Initiation Protocol (SIP); rfc3486.txt", IETF Standard, Internet Engineering Task Fore, IETF, CH, Feb. 2003, pp. 1-12.

* cited by examiner

*Primary Examiner* — Suk Jin Kang (57) ABSTRACT

As SIP usage becomes prolific in 3G wireless communications, challenges are presented to using the current SIP protocols for real-time communications due to the limited signaling compression offered via SIP become. Signaling introduces unwanted delays on limited bandwidth and increases the call setup time. Additionally, SIP messages are large—from a few hundred bytes to several kilobytes—and compression is not offered on all available fields. The invention provides for compression of the VIA field of SIP messages through several techniques and thereby achieves lower signaling delays that reduce complex call setup delays and reduce the loss of bandwidth to necessary in-call signaling.

16 Claims, 5 Drawing Sheets

| SIP Request | Explanation |
|---|---|
| Header | |
| INVITE sip:vinod@mumbai.tcs.co.in SIP/2.0 | Method type, request URI and SIP Version |
| Via:SIP/2.0/UDP anilworkstation.com | IP address and port of previous hop |
| From: Anil <sip:anil@delhi.tcs.co.in> | Caller |
| To: Vinod Bhat <sip:vinod@mumbai.tcs.co.in> | Callee |
| Call-ID:123456789@anilworkstation.com | Globally unique ID for this call |
| Content-Type:application/sdp | The body type, an SDP message |
| Cseq:1 INVITE | Command Sequence number and type |
| Content-Length: ... | Length of the body of the SIP method |
| *Blank line separates header from body* | |
| Body | |
| v=0 | SDP version |
| o=anil 28960783 0 IN IP4 157.227.12.184 | Owner/creator and session identifier |
| s=Urgent phone call from Anil | The name of the session |
| c=IN IP4 anilworkstation.com | Connection information |
| t=3126288799 3126289399 | Time the session is active |
| m=audio 5002 RTP/AVP 0 3 5 | Media name and transport address |

FIG. 1 (PRIOR ART)

| SIP Response | Explanation |
|---|---|
| Header ||
| SIP/2.0 200 OK | SIP Version and response code |
| Via:SIP/2.0/UDP hop.mumbai.tcs.co.in<br>Via:SIP/2.0/UDP anilworkstation.com | IP addresses and port of previous hops |
| From: Anil <sip:anil@delhi.tcs.co.in> | Caller |
| To: Vinod Bhat<br><sip:vinod@mumbai.tcs.co.in><br>;tag=35453231 | Callee |
| Call-ID:123456789@anilworkstation.com | Globally unique ID for this call |
| Content-Type: application/sdp | The body type, an SDP message |
| CSeq: 1 INVITE | Command Sequence number and type |
| Content-Length: ... | Length of the body of the SIP method |
| Blank line separates header from body ||
| Body ||
| v=0 | SDP version |
| o=vinod 34234567 12354354 IN IP4 197.27.12.14 | Owner/creator and session identifier |
| s=Ok | The name of the session |
| c=IN IP4 vinodworkstation.mumbai.tcs.co.in | Connection information |
| t=3126288799 3126289399 | Time the session is active |
| m=audio 5002 RTP/AVP 0 | Media name and transport address |

```
INVITE sip:6309792003@135.2.53.243:5060 SIP/2.0
Via: SIP/2.0/UDP 172.18.5.71:5060;branch=z9hG4bKc84fe3e0c3a2fc54f0f0c58a3831550d4404782-114114023989821
Via: SIP/2.0/UDP 127.0.0.1;branch=z9hG4bK_00_932017224-931956744;lsstag=pt-10-10
Via: SIP/2.0/UDP 172.18.5.69:5060;received=172.18.5.69;branch=z9hG4bKc84fe3e0c3a2fc54f0f0c58a3831550d4404733-114114023987692;1hop
Via: SIP/2.0/UDP 27.0.0.1;branch=z9hG4bK_00_934373960-934346312;dp;lsstag=st-10-10
Via: SIP/2.0/UDP 172.18.5.70:8000;received=172.18.5.70;branch=z9hG4bKc84fe3e0c3a2fc54f0f0c58a3831550d4404737-114114023984672;1hop
Via: SIP/2.0/UDP 127.0. 0.1;branch=z9hG4bK_00_904229768-904195336;lsstag=i-5-5
Via: SIP/2.0/UDP 172.18.5.71:7777;received=172.18.5.71;branch=z9hG4bK8d68cf6519cac27963e27b98dde812f4404782-114114023871969;1hop
Via: SIP/2.0/UDP 127.0.0.1;branch=z9hG4bK_00_931959688-925001096
Via: SIP/2.0/UDP 172.18.5.69:5060;received=172.18.5.69;branch=z9hG4bK1e475bbbfeedaeda9e9b723f3fc29e004404733-114114023970743;1hop
Via: SIP/2.0/UDP 172.18.5.70:8000;received=172.18.5.70;branch=z9hG4bK1e475bbbfeedaeda9e9b723f3fc29e004404737-114114023984672;1hop
Via: SIP/2.0/UDP 127.0.0.1;branch=z9hG4bK_00_934351112-932241928;dp;lsstag=so-9-9
Via: SIP/2.0/UDP 172.18.5.71:5060;received=172.18.5.71;branch=z9hG4bK1e475bbbfeedaeda9e9b723f3fc29e004404782-114114023960885;1hop
Via: SIP/2.0/UDP 127.0.0.1;branch=z9hG4bK_00_932039432-907315336;lsstag=po-9-9
Via: SIP/2.0/UDP 135.2.51.6:9043;received=135.2.51.6;branch=z9hG4bK43779
To: <sip:6309792003@dv512.lab.com>
From: <sip:6309792002@dv512.lab.com>;tag=36403
Call-ID: fd1f1a4f4d5d9e2c
CSeq: 1 INVITE
Allow: INVITE,ACK,CANCEL,OPTIONS,BYE,REFER,NOTIFY,MESSAGE,SUBSCRIBE,INFO
Contact: <sip:6309792004@135.2.51.124:5060>
Content-Type: application/sdp
Max-Forwards: 64
P-Asserted-Identity: <sip:6309792004@dv512.lab.com>
P-Called-Party-ID: <sip:6309792003@dv512.lab.com;user=phone>
Record-Route: <sip:pcsf-stdn.imsgroup0-000.dv512.lab.com:5060;lr;lsstag=pt-4-4>
User-Agent: eyeBeamrelease 3006o stamp 17551
Content-Length: 273 v=0
o=- 562396113 562396139 IN IP4 135.2.51.124
s=eyeBeam
c=IN IP4 135.2.51.124
t=0 0
m=audio 9440 RTP/AVP 100 6 0 8 3 1 8 5 101
a=alt:1 1 : C650B79B 00000000C8 135.2.51.124 9440
a=fmtp:101 0-15
a=rtpmap:100 speex/16000
a=rtpmap:101 telephone-event/8000
a=sendrecv
```

PROTOCOL AND METHOD OF VIA FIELD COMPRESSION IN SESSION INITIATION PROTOCOL SIGNALING FOR 3G WIRELESS NETWORKS

TECHNICAL FIELD

The present invention generally relates to the field of wireless communications and more specifically relates to improved session initiation protocol signaling for 3G wireless networks by using compression in the VIA field to reduce the signaling overhead in a session initiation protocol message.

BACKGROUND

The session initiation protocol ("SIP") is an application-layer control protocol that can establish, modify and terminate multimedia sessions (also referred to as "conferences") or Internet telephony calls. SIP is defined in RFC2543. SIP can invite participants to unicast and multicast conferences and does not require that the initiator be a member of the conference to which it is sending invitations. Media and participants can be added to an existing session. SIP transparently supports name mapping and redirection services, allowing the implementation of ISDN and Intelligent Network telephony subscriber services. These facilities also enable personal mobility, which provides the ability to reach a called party at a single, location-independent address.

As a traditional text-based Internet protocol, it resembles the hypertext transfer protocol ("HTTP") and simple mail transfer protocol ("SMTP"). Like these protocols, SIP is a textual protocol based on the client-server model, with requests generated by one entity (the client), and sent to a receiving entity (the server) which responds the requests. A request invokes a method on the server and can be sent either over the transmission control protocol ("TCP") or the user datagram protocol ("UDP"). The most important SIP method (there are currently six) is the INVITE method, used to initiate a call between a client and a server. The other SIP methods are ACK, OPTIONS, BYE, CANCEL and REGISTER. A new INFO method has also been proposed as part of SIP-extensions and is detailed in RFC 2976.

SIP uses session description protocol ("SDP") for media description. SIP supports five aspects of establishing and terminating multimedia communications; which are user location, user capabilities, user availability, call setup and call handling.

SIP messages are typically either requests or responses. Requests flow from a client to a server and responses flow from a server to a client. These requests and responses include different headers to describe the details of the communication. SIP header fields are similar to HTTP header fields in both syntax and semantics. Messages use header fields to specify such things as caller, callee, path of the message, type and length of the message body and so on. Some of the header fields are used in all messages, the rest are used when appropriate. The order in which the headers appear is generally not important, except that the VIA field and the HOP-BY-HOP headers must appear before END-TO-END headers.

Figure 1:
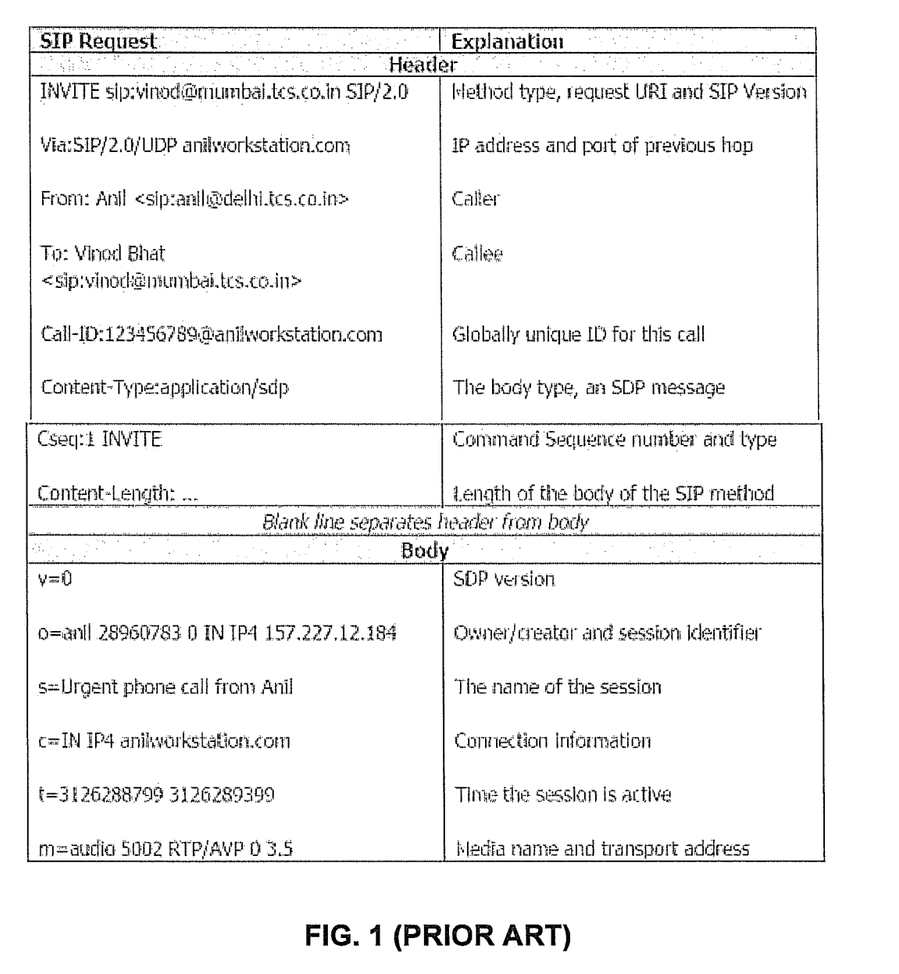
FIG. 1 is a table diagram illustrating an example prior art SIP request.
Figure 2:
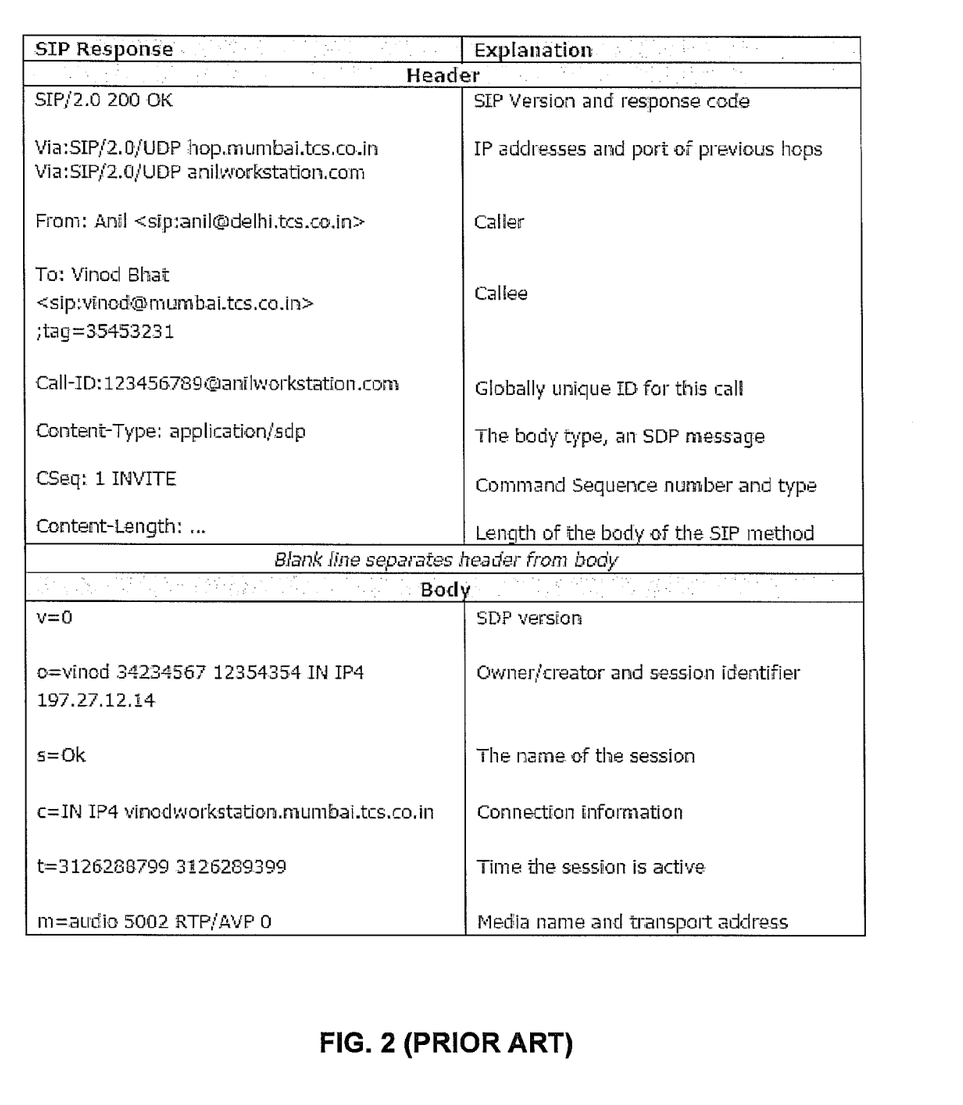
FIG. 2 is a table diagram illustrating an example prior art SIP response.

The VIA field indicates the path followed by a message (either a request or a response) so far. Typical examples of the VIA field in both SIP requests and responses are shown in FIGS. 1 and 2. The VIA field is one of the header fields that is required in all SIP messages. One significant disadvantage of SIP when used for 3G wireless communications is that the signaling overhead severely increases call setup time for real time applications. To address this problem, the industry has produced some limited signaling compression utilities, namely SIGCOMP. However, SIGCOMP still suffers from an inability to provide compression on many of fields found in signaling messages. In particular, the VIA field is required in all SIP messages and can grow to be quite large as a message follows a lengthy path from sender to recipient. The VIA field cannot be compressed. Accordingly, the industry has a need for a solution that overcomes these significant problems found in conventional SIP messaging as described above.

SUMMARY

A protocol and method of VIA field compression in SIP signaling for 3G wireless networks is disclosed that reduces the inherent delays introduced by signaling that increase call setup time. The compression of the VIA field achieves lower signaling delays that reduce complex call setup delays and reduces the loss of bandwidth to necessary in-call signaling. Compression in the VIA field is accomplished by redundancy removal. Redundancy removal eliminates redundant and therefore unnecessary information that is included in messages after the initial message in the sequence. The use of parameters is employed to notify the parser of the excluded redundancies so that the message conveys the same information with a significantly reduced byte size.

Alternatively, a token approach to redundancy removal can be employed. This approach parses through the initial message in the sequence and uses a token in the place of certain identified strings. Later messages in the sequence then use the token instead of the complete string in order to significantly reduce the byte size in the overall message while providing the same information to the recipient of the message.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts.

FIG. 7 is table diagram illustrating an example message header with uncompressed VIA fields under conventional SIP.

DETAILED DESCRIPTION

Certain embodiments as disclosed herein provide for improved SIP signaling for 3G wireless networks by using compression in the VIA field to reduce the signaling overhead in SIP messages. For example, one method as disclosed herein allows for the VIA header to be compressed by eliminating redundant address information found in each intermediate address along the path traveled by the message. An alternative method allows for the VIA header to be compressed by tokenizing certain elements of the header and using the tokens in the VIA header in place of the raw strings.

After reading this description it will become apparent to one skilled in the art how to implement the invention in various alternative embodiments and alternative applications. However, although various embodiments of the present invention are described herein, it is understood that these embodiments are presented by way of example only, and not limitation. As such, this detailed description of various alternative embodiments should not be construed to limit the scope or breadth of the present invention as set forth in the appended claims.

Figure 3:
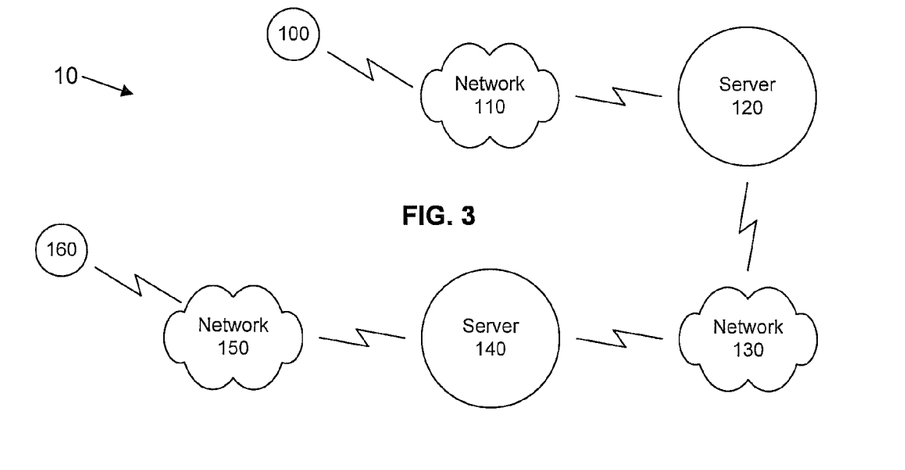
FIG. 3 is a network diagram illustrating an example wireless network according to an embodiment of the present invention.

FIG. 3 is a network diagram illustrating an example wireless network 10 according to an embodiment of the present invention. In the illustrated embodiment, the network 10 comprises two nodes 100 and 160, a plurality of networks 110, 130, and 150, and a plurality of servers 120 and 140. In practice, a SIP message from node 100 to node 160 travels along a path through network 110 to server 120, through network 130 to server 140, and through network 150 to node 160. As will be understood in the art, in alternative embodiments a SIP message may take many different routes from one node to another, depending on the nature and size of the underlying network.

In one embodiment, nodes 100 and 160 are wireless communication devices and networks 110 and 150 are wireless communication networks. In alternative embodiments, the nodes 100 and 160 may be other types of network devices such as personal computers, laptops, personal digital assistants, or other such devices having the ability to communicate with each other and other nodes over networks 110, 130, and 150.

In one embodiment, the servers 120 and 140 perform the function of routing packets across the various networks 110, 130, and 150. For example, the servers 120 and 140 may be positioned on the backbone of a public network infrastructure such as that particular combination of networks widely known as the Internet. Alternatively, the servers 120 and 140 may be entirely located within a private network, although performing the same function of routing traffic across networks or network segments.

Figures 4, 5, 6:
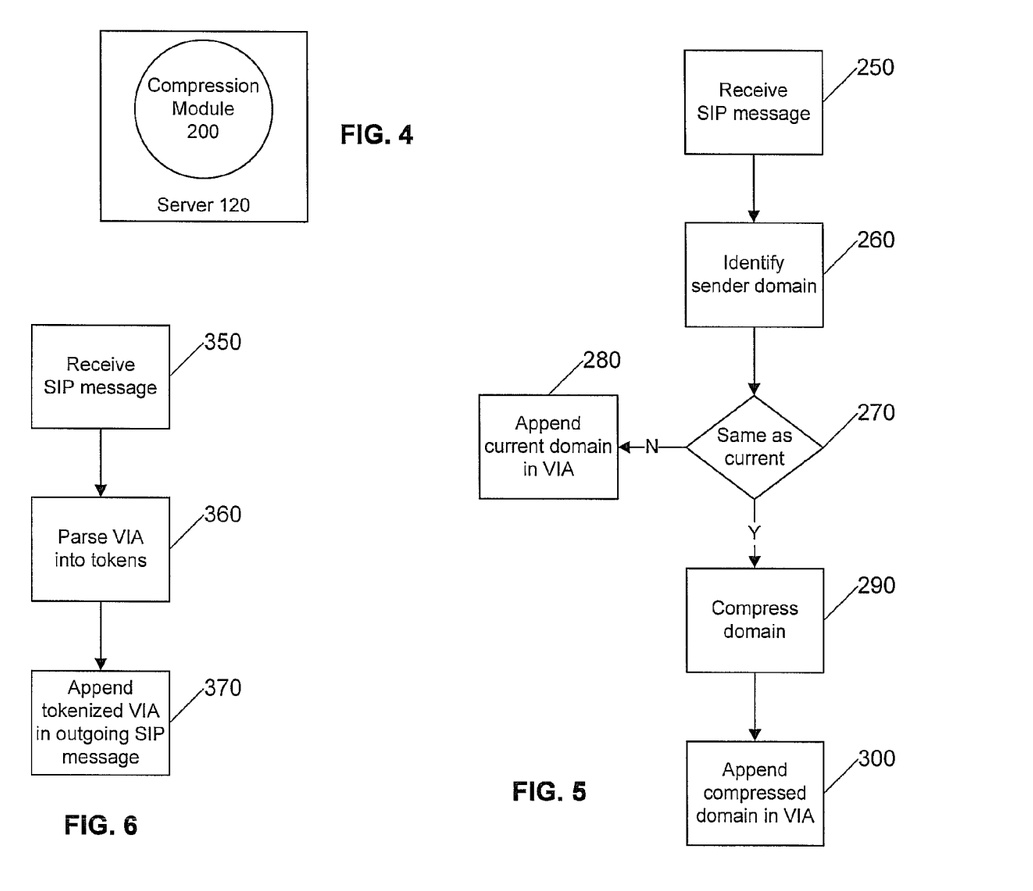
FIG. 4 is a block diagram illustrating an example network device in the path of an SIP message according to an embodiment of the present invention.
FIG. 5 is a flow diagram illustrating an example process for compressing the VIA field in a SIP message according to an embodiment of the present invention.
FIG. 6 is a flow diagram illustrating an alternative example process for compressing the VIA field in a SIP message according to an embodiment of the present invention.

FIG. 4 is a block diagram illustrating an example network device in the path of an SIP message according to an embodiment of the present invention. In the illustrated embodiment, the server 120 comprises a compression module 200. The compression module 200 is configured to examine SIP messages received at the server 120 and compress the VIA message fields in the message header. The compression module 200 may carry out the compression in a variety of ways, including, for example, by removing redundancies in the address information found in the VIA message field or by tokenizing the VIA message field.

FIG. 5 is a flow diagram illustrating an example process for compressing the VIA field in an SIP message according to an embodiment of the present invention. The illustrated process may be carried out by a compression module such as the one previously described with respect to FIG. 4. Initially, in step 250 the network device receives an SIP message. Next, in step 260, the network device examines the VIA field in the header information of the SIP message to identify the domain from which the SIP message was sent. If the domain from which the SIP message was sent is not the same as the current domain, as determined in step 270, then in step 280 the network device appends the current domain in the VIA field and sends the message along its path to the destination node.

If, however, the domain from which the SIP message was sent is the same as the current domain, as determined in step 270, then in step 290 the network device compresses the domain information and appends the compressed domain information in the VIA field as shown in step 300 and sends the message along its path to the destination node. For example, if the VIA header information in the received message was as follows:

VIA: SIP/2.0/UDP ykharia.kyocera-wireless.com and the next sender node would add:

VIA: SIP/2.0/UDP ajuneja.kyocera-wireless.com then the resulting compressed VIA header would appear as:

VIA: SIP/2.0/UDP ykharia.kyocera-wireless.com HOP/ajuneja/PREV

Notably, the use of "HOP" as the keyword parameter can be changed to any suitable alternative keyword that identifies to the parser at the next node and the receiving node that there are now two or more hops in the path of the SIP message. Similarly, the use of "PREV" can be changed to any alternative keyword that identifies that the same domain name from the previous portion of the VIA header applies to the second node as well as the first node. In this fashion, the byte size of the compressed VIA field is significantly reduced from the second node forward along the path of the SIP message.

FIG. 6 is a flow diagram illustrating an alternative example process for compressing the VIA field in an SIP message according to an embodiment of the present invention. The illustrated process may be carried out by a compression module such as the one previously described with respect to FIG. 4. Initially, in step 350, the network device receives the SIP message. Next, in step 360 the VIA header in the SIP message is parsed and separated into various fields and tokes are assigned to each field. In one embodiment, the individual fields are unique to the VIA and represent repetitive segments typically found in the VIA field. For example, protocol information such as SIP/2.0/UDP may be found in each VIA field of every message. Accordingly, this common string can be assigned to the token "1" for use in the VIA header. Similarly, username and domain information can be identified and such a string can be assigned to the token "2" for use in the VIA header.

Advantageously, the username and domain information may be further broken down such that the username information and the domain information may each be separately assigned to a token. For example, the username information can be assigned to the token "2/1," the sub-domain information can be assigned to the token "2/2," and the top level domain information can be assigned to the token "2/3." Thus, for an original VIA message header of:

VIA: SIP/2.0/UDP ykharia.kyocera-wireless.com the tokens may be established as follows:

1=VIA: SIP/2.0/UDP

2=ykharia.kyocera-wireless.com

2/1=ykharia
2/2=kyocera-wireless
2/3=com

Thus, the tokenized VIA header in the outgoing SIP message would appear as:

1.ykharia.2/2.2/3

Advantageously, the token index (providing the expanded strings for each token) may be passed along with each SIP message in related fields so that each intermediate network device receiving the SIP message and passing it along can determine how best to compress the VIA header information.

FIG. 7 is table diagram illustrating an example INVITE message header 400 with uncompressed VIA fields under conventional SIP. Advantageously, such an SIP message can be compressed by nearly 20% using the redundancy removal technique to compress the VIA fields. Moreover, the SIP message can be compressed by about 30% using the tokenizing technique.

Figure 8:
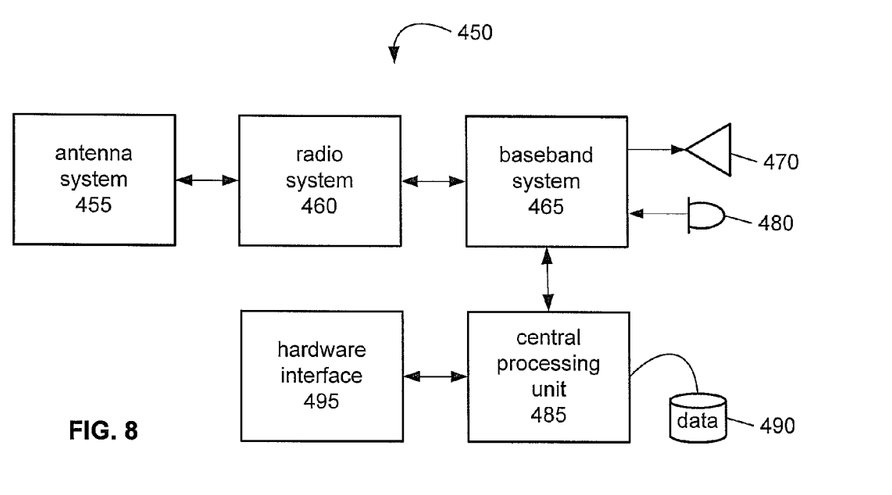
FIG. 8 is a block diagram illustrating an example wireless communication device that may be used in connection with various embodiments described herein.

FIG. 8 is a block diagram illustrating an example wireless communication device 450 that may be used in connection with various embodiments described herein. For example, the wireless communication device 450 may be used in conjunction with a network device in a wireless communication network such as previously described with respect to FIG. 3. However, other wireless communication devices and/or architectures may also be used, as will be clear to those skilled in the art.

In the illustrated embodiment, wireless communication device 450 comprises an antenna system 455, a radio system 460, a baseband system 465, a speaker 464, a microphone 470, a central processing unit ("CPU") 485, a data storage area 490, and a hardware interface 495. In the wireless communication device 450, radio frequency ("RF") signals are transmitted and received over the air by the antenna system 455 under the management of the radio system 460.

In one embodiment, the antenna system 455 may comprise one or more antennae and one or more multiplexors (not shown) that perform a switching function to provide the antenna system 455 with transmit and receive signal paths. In the receive path, received RF signals can be coupled from a multiplexor to a low noise amplifier (not shown) that amplifies the received RF signal and sends the amplified signal to the radio system 460.

In alternative embodiments, the radio system 460 may comprise one or more radios that are configured to communication over various frequencies. In one embodiment, the radio system 460 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 460 to the baseband system 465.

If the received signal contains audio information, then baseband system 465 decodes the signal and converts it to an analog signal. Then the signal is amplified and sent to the speaker 470. The baseband system 465 also receives analog audio signals from the microphone 480. These analog audio signals are converted to digital signals and encoded by the baseband system 465. The baseband system 465 also codes the digital signals for transmission and generates a baseband transmit audio signal that is routed to the modulator portion of the radio system 460. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 455 where the signal is switched to the antenna port for transmission.

The baseband system 465 is also communicatively coupled with the central processing unit 485. The central processing unit 485 has access to a data storage area 490. The central processing unit 485 is preferably configured to execute instructions (i.e., computer programs or software) that can be stored in the data storage area 490. Computer programs can also be received from the baseband processor 465 and stored in the data storage area 490 or executed upon receipt. Such computer programs, when executed, enable the wireless communication device 450 to perform the various functions of the present invention as previously described. For example, data storage area 490 may include various software modules (not shown) that were previously described with respect to FIG. 4.

In this description, the term "computer readable medium" is used to refer to any media used to provide executable instructions (e.g., software and computer programs) to the wireless communication device 450 for execution by the central processing unit 485. Examples of these media include the data storage area 490, microphone 470 (via the baseband system 465), antenna system 455 (also via the baseband system 465), and hardware interface 495. These computer readable mediums are means for providing executable code, programming instructions, and software to the wireless communication device 450. The executable code, programming instructions, and software, when executed by the central processing unit 485, preferably cause the central processing unit 485 to perform the inventive features and functions previously described herein.

The central processing unit 485 is also preferably configured to receive notifications from the hardware interface 495 when new devices are detected by the hardware interface. Hardware interface 495 can be a combination electromechanical detector with controlling software that communicates with the CPU 485 and interacts with new devices. The hardware interface 495 may be a firewire port, a USB port, a Bluetooth or infrared wireless unit, or any of a variety of wired or wireless access mechanisms. Examples of hardware that may be linked with the device 450 include data storage devices, computing devices, headphones, microphones, and the like.

Figure 9:
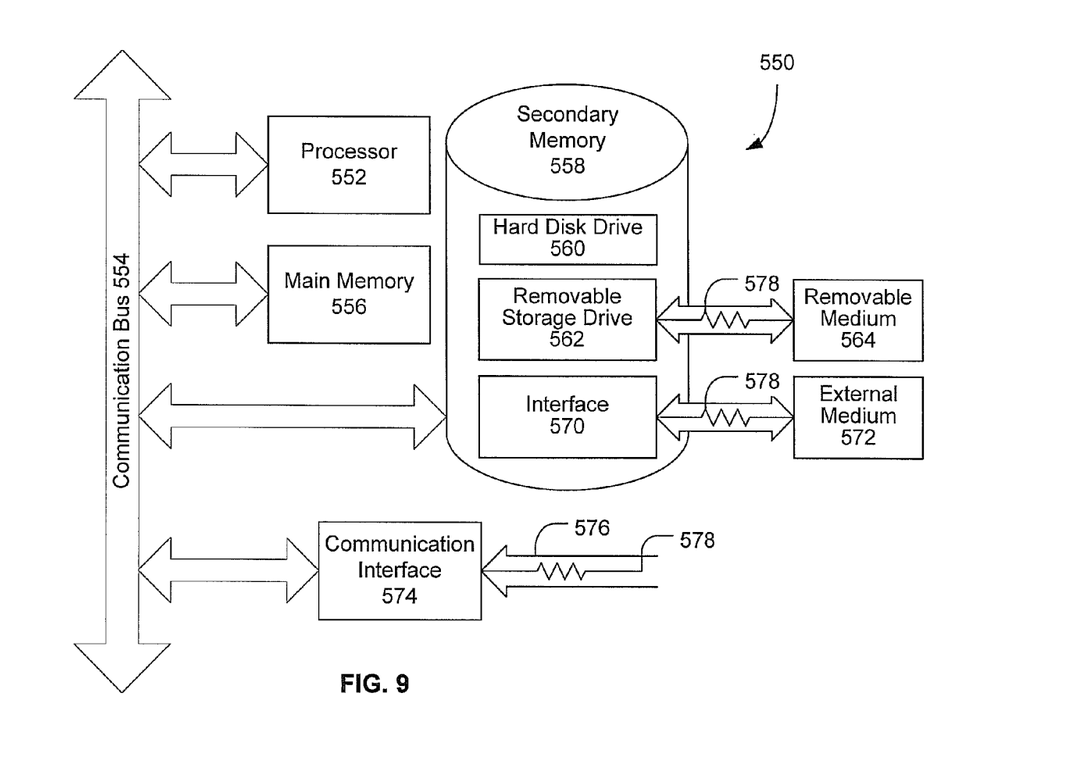
FIG. 9 is a block diagram illustrating an example computer system that may be used in connection with various embodiments described herein.

FIG. 9 is a block diagram illustrating an example computer system 550 that may be used in connection with various embodiments described herein. For example, the computer system 550 may be used in conjunction with a server computer as previously described with respect to FIG. 3. However, other computer systems and/or architectures may be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A system for compressing a VIA field in a session initiation protocol (SIP) signaling message, the system comprising:
   a network device situated along a network path, the network device configured to process SIP signaling messages; and
   a compression module configured to be executed by the network device, wherein the compression module receives an SIP signaling message, compresses the SIP signaling message by removing redundant information in the VIA field and retaining non-redundant information in the VIA field, and appends at least one parameter in the VIA field to identify a portion of redundant information removed from the VIA field, the redundant information comprising redundant address information of each intermediate address along a path traveled by the SIP signaling message.

2. The system of claim 1, wherein the compression module also inserts a parameter which identifies a hop in the path of the SIP message.

3. The system of claim 1, wherein the compression module also replaces information in the VIA field with one or more tokens.

4. The system of claim 3, wherein the compression module is configured to parse the SIP signaling message to identify the values of the one or more tokens in the compressed VIA field.

5. The system of claim 3, wherein the compression module is configured to identify one or more repetitive strings in the VIA field and create a token for each of the one or more repetitive strings.

6. The system of claim 1, wherein the first portion is domain information.

7. The system of claim 1, wherein the compression module is further configured to replace a first portion of the VIA field with a parameter that identifies a relative location, in the VIA field, of a second, uncompressed portion of the VIA field that is the same as the first portion.

8. A method for compressing a VIA field in a session initiation protocol (SIP) signaling message, the method comprising:
   receiving an SIP message;
   identifying a domain associated with a sender of the SIP message;
   comparing the identified domain with a current domain;
   compressing the current domain when it is the same as the identified domain by removing redundant information in the VIA field and retaining non-redundant information in the VIA field and appending at least one parameter in the VIA field to identify a portion of redundant information removed from the VIA field, the redundant information comprising redundant address information of each intermediate address along a path traveled by the SIP signaling message;
   including the compressed current domain in the VIA field of the SIP message; and
   sending the SIP message.

9. The method of claim 8, wherein the compressing step further comprises including at least one parameter indicating a hop in the path of the SIP message.

10. The method of claim 8, wherein the compressing step further comprises replacing the current domain with a parameter in the VIA field of the SIP message, wherein the parameter identifies a relative location, in the VIA field, of the identified domain.

11. A method for compressing a VIA field in a session initiation protocol (SIP) signaling message, the method comprising:
   receiving an SIP message;
   parsing a VIA field in the SIP message to identify a first portion and a second portion of the VIA field that are the same;
   removing the second portion of the VIA field;
   retaining the first portion of the VIA field;
   appending at least one parameter in the VIA field to identify the second portion of the VIA field that was removed, the second portion comprising redundant address information of each intermediate address along a path traveled by the SIP signaling message; and
   sending the SIP message.

12. The method of claim 11, wherein the second portion comprises a protocol identifier.

13. The method of claim 11, wherein the second portion comprises a user name.

14. The method of claim 11, wherein the second portion comprises a sub-domain.

15. The method of claim 11, wherein the second portion comprises a top level domain.

16. The method of claim 11, further comprising:
    replacing the second portion of the VIA field with an indication of a relative location of the first portion of the VIA field in the VIA field.

\* \* \* \* \*